United States Patent [19]

Bordwell et al.

[11] Patent Number: 5,621,192

[45] Date of Patent: Apr. 15, 1997

[54] HOUSING FOR ELECTRICAL OUTLETS

[75] Inventors: Mark Bordwell, Memphis; Michael Pratt, Cordova, both of Tenn.

[73] Assignee: Thomas & Betts Corporation, Memphis, Tenn.

[21] Appl. No.: 80,468

[22] Filed: Jun. 21, 1993

[51] Int. Cl.⁶ .................................................. H02G 3/14
[52] U.S. Cl. ................................................................ 174/67
[58] Field of Search ........................ 174/50, 67; 439/135, 439/136, 142, 147; 220/242

[56]  References Cited

U.S. PATENT DOCUMENTS

| | | | |
|---|---|---|---|
| 1,630,401 | 5/1927 | Meyer . | |
| 2,250,977 | 7/1941 | Walker | 220/3.8 |
| 2,304,870 | 12/1942 | Yost | 173/332 |
| 2,441,643 | 5/1948 | Mickler | 200/54 |
| 2,510,745 | 6/1950 | Kilgore | 174/48 |
| 2,526,606 | 10/1950 | Gregg | 174/67 |
| 2,709,198 | 5/1955 | Holtshooser | 174/67 |
| 2,757,817 | 8/1956 | Egan | 220/3.5 |
| 2,761,112 | 8/1956 | Torrivia | 339/92 |
| 2,870,933 | 1/1959 | Winter | 220/24.3 |
| 2,880,264 | 3/1959 | Ruslin | 174/67 |
| 2,934,591 | 4/1960 | Tiikkoinen | 174/67 |
| 2,942,226 | 6/1960 | Low | 339/75 |
| 2,985,334 | 5/1961 | Slater | 220/24.3 |
| 2,987,214 | 6/1961 | Radack | 220/243 |
| 2,987,690 | 6/1961 | Marhais | 339/36 |
| 3,140,344 | 7/1964 | Slater et al. | 174/67 |
| 3,188,379 | 6/1965 | Simon | 174/38 |
| 3,189,212 | 6/1965 | Bellek | 220/24.3 |
| 3,200,989 | 8/1965 | Hubbell | 220/24.3 |
| 3,204,807 | 9/1965 | Ramsing | 220/24.3 |
| 3,252,611 | 5/1966 | Weitzman et al. | 220/24.3 |
| 3,293,588 | 12/1966 | Blonder | 339/37 |
| 3,402,846 | 9/1968 | Zerwes | 220/3.8 |
| 3,428,936 | 2/1969 | Amao, Sr. | 339/39 |
| 3,467,763 | 9/1969 | Shaw | 174/67 |
| 3,491,327 | 1/1970 | Tait et al. | 339/36 |
| 3,598,900 | 8/1971 | Drake | 174/138 |
| 3,621,115 | 11/1971 | Kobher | 174/67 |
| 3,701,451 | 10/1972 | Schindler et al. | 220/27 |
| 3,716,815 | 2/1973 | Riches | 339/44 |
| 3,792,414 | 2/1974 | Smith | 339/36 |
| 3,811,004 | 5/1974 | Moore | 174/67 |
| 3,887,802 | 6/1975 | Goralnik | 240/73 |
| 4,036,396 | 7/1977 | Kennedy et al. | 220/242 |
| 4,078,691 | 3/1978 | Mesh | 220/85 |
| 4,083,618 | 4/1978 | Busch, Jr. | 339/75 |
| 4,102,466 | 7/1978 | Jadatz | 220/3.8 |
| 4,109,095 | 8/1978 | Kling et al. | 174/67 |
| 4,134,516 | 1/1979 | Sullo | 220/242 |
| 4,265,366 | 5/1981 | Boteler | 220/3.3 |
| 4,291,817 | 9/1981 | Spitzer et al. | 174/50 |
| 4,342,493 | 8/1982 | Grenell | 339/44 |
| 4,381,063 | 4/1983 | Leong | 220/242 |
| 4,381,879 | 5/1983 | Ehrenfels et al. | 339/44 |
| 4,424,407 | 1/1984 | Barbic | 174/67 |
| 4,500,008 | 2/1985 | Cook | 220/242 |
| 4,505,403 | 3/1985 | Bowden, Jr. et al. | 220/242 |
| 4,530,555 | 7/1985 | South | 339/39 |
| 4,541,538 | 9/1985 | Swetnam | 220/3.8 |
| 4,584,430 | 4/1986 | Belknap | 174/67 |
| 4,593,541 | 6/1986 | Hollis | 70/57 |
| 4,603,932 | 8/1986 | Heverly . | |
| 4,605,817 | 8/1986 | Lopez | 174/67 |
| 4,654,470 | 3/1987 | Feldman et al. | 174/50 |
| 4,660,912 | 4/1987 | Tomek | 339/44 |

(List continued on next page.)

FOREIGN PATENT DOCUMENTS 644330  7/1962  Canada ...................... 247/3

*Primary Examiner*—Kristine L. Kincaid
*Assistant Examiner*—Paramita Ghosh
*Attorney, Agent, or Firm*—Michael L. Hoelter; Salvatore J. Abbruzzese

[57]  ABSTRACT

A protective housing for electrical outlets and the like includes a box surrounding the outlets and a cover. A gasketless joint is formed between the hinged cover and the box for inhibiting entry of moisture into the box. The box includes a slot in its peripheral wall for receiving a cord with a plug that is positioned inside the box.

18 Claims, 6 Drawing Sheets

U.S. PATENT DOCUMENTS

| | | | |
|---|---|---|---|
| 4,711,634 | 12/1987 | Antone, II et al. | 439/136 |
| 4,740,655 | 4/1988 | Ford | 174/67 |
| 4,760,215 | 7/1988 | Cook et al. | 174/67 |
| 4,774,384 | 9/1988 | Gregory | 174/67 |
| 4,784,610 | 11/1988 | Stuart | 439/144 |
| 4,800,588 | 1/1989 | Poster, Jr. | 379/412 |
| 4,803,307 | 2/1989 | Shotey | 174/67 |
| 4,810,897 | 3/1989 | Shotey | 307/112 |
| 4,874,906 | 10/1989 | Shotey | 174/67 |
| 4,910,770 | 3/1990 | Colins et al. | 379/399 |
| 4,915,638 | 4/1990 | Domian | 439/142 |
| 4,952,755 | 8/1990 | Engel et al. | 174/67 |
| 4,952,756 | 8/1990 | Meyers | 174/67 |
| 4,967,924 | 11/1990 | Murofushi et al. | 220/3.8 |
| 4,973,797 | 11/1990 | Jorgensen et al. | 174/50 X |
| 4,988,832 | 1/1991 | Shotey | 174/67 |
| 5,228,584 | 7/1993 | Williams, Jr. | 220/3.8 |
| 5,280,135 | 1/1994 | Berlin et al. | 174/67 |
| 5,317,108 | 5/1994 | Praire, Jr. | 174/67 |

HOUSING FOR ELECTRICAL OUTLETS

BACKGROUND OF THE INVENTION

This application relates to the art of protective housings and, more particularly, to such housings for protecting electrical devices. The invention is particularly applicable for use in protecting electrical plug and receptacle connections, and will be described with specific reference thereto. However, it will be appreciated that the invention has broader aspects and can be used in other environments.

Environmentally exposed electrical receptacles are commonly protected by securing a protective housing to the junction box in which the receptacle is mounted. Such housings commonly include a base having a cover hinged thereto. Opening the cover allows a plug to be inserted or removed from the electrical receptacle. A slot in a lower portion of the cover peripheral wall receives the cord with a plug for allowing the cover to be closed when the plug is received in a receptacle. It is sometimes difficult to align the cord with a slot in the lower portion of the cover when the cover is being closed.

Housings of the type described commonly have an elastomeric seal or gasket between the base and cover for inhibiting entry of moisture and dirt when the cover is closed. Such seals or gaskets become ineffective with time and failure to replace same renders the housing very ineffective for its intended purpose. It would be desirable to have such a housing that did not require a separate elastomeric seal or gasket.

SUMMARY OF THE INVENTION

A protected housing of the type described includes a box having a backwall with a peripheral wall extending upwardly therefrom. The box peripheral wall has a terminal end surrounding a box front opening. An external peripheral groove in the box peripheral wall adjacent the box front opening helps to inhibit entry of moisture and dirt into the box when a cover is in a closed position. The box peripheral wall is inwardly offset on the side of the groove toward the box front opening to define a shoulder on the other side of the groove that faces in a direction away from the backwall.

In a preferred arrangement, the peripheral groove in the box peripheral wall is defined between a pair of first and second outwardly projecting peripheral beads. A first bead is located adjacent the terminal end of the box peripheral wall at the front opening of the box. The second peripheral bead is spaced toward the backwall from the first bead. The box peripheral wall is inwardly offset between the first and second beads so that the shoulder that faces in a direction away from the backwall is adjacent the second bead.

The protective housing box is attachable to a junction box with the housing box backwall in a generally vertical position. In such position, the box peripheral wall includes upper and lower peripheral wall portions, and opposite side wall portions. The upper peripheral wall portion is provided with hinging means for hingedly connecting a cover thereto. The lower portion of the box peripheral wall has a latch projection thereon for cooperation with a catch on a cover.

A cover hinged to the box has a first cover peripheral wall portion closely receivable over the first bead on the box and an outwardly offset second cover peripheral wall portion closely receivable over the second bead on the box. A shoulder on the cover between the cover first and second peripheral wall portions cooperates with the shoulder on the box peripheral wall. The overlapping areas between the cover and box peripheral walls provide a tortuous path that inhibits moisture and dirt from entering the box through its front opening.

The lower portion of the box has a cord receiving slot therein for receiving a cord with a plug that is positioned within the box when received in a receptacle. The box peripheral wall has a predetermined height extending upwardly from the box backwall, and the cord receiving slot has a length that is greater than one-half of the box peripheral wall height but substantially less than the entire height.

It is a principal object of the present invention to provide an improved protective housing for electrical outlets.

It is also an object of the invention to provide an improved protective housing that has an improved sealing arrangement between a housing box and cover.

It is a further object of the invention to provide an improved hinging and latching arrangement between the cover and box of a protective housing.

DESCRIPTION OF A PREFERRED EMBODIMENT

Figure 1:
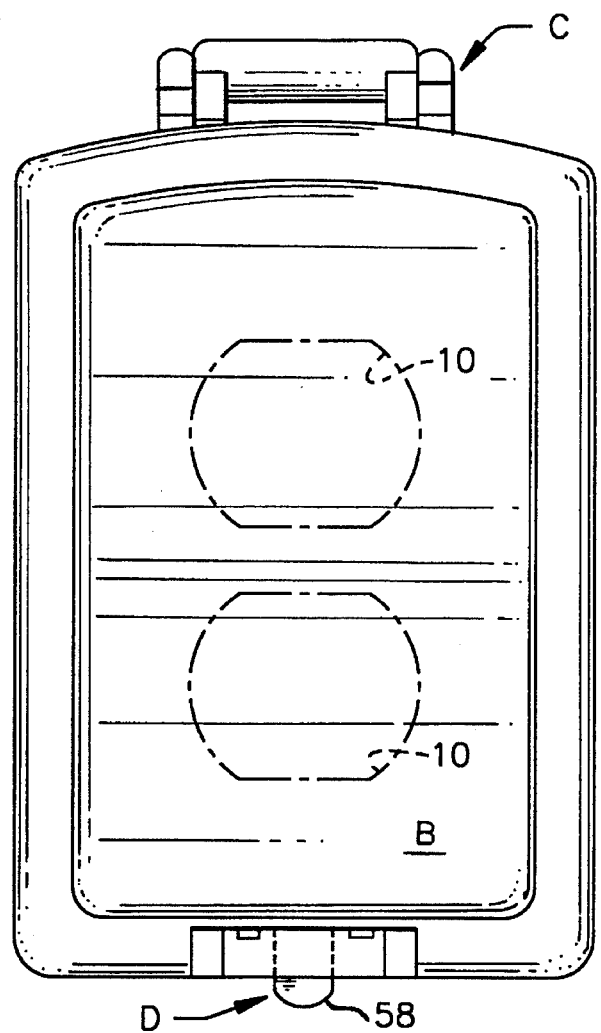
FIG. 1 is a top plan view of a protective housing constructed in accordance with the present application.
Figure 2:
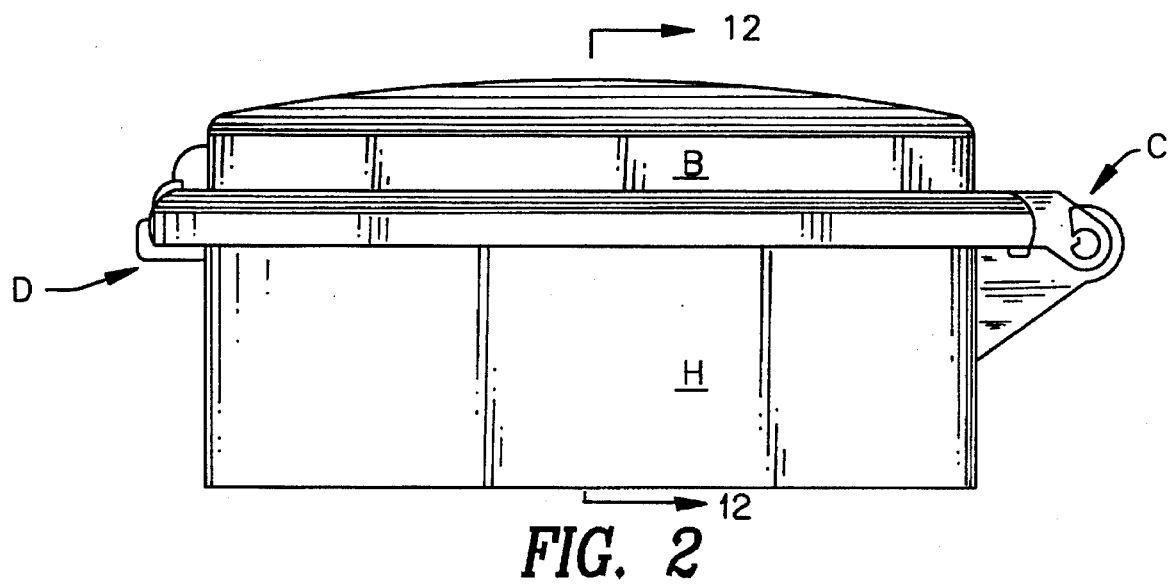
FIG. 2 is a side elevational view thereof.
Figure 3:
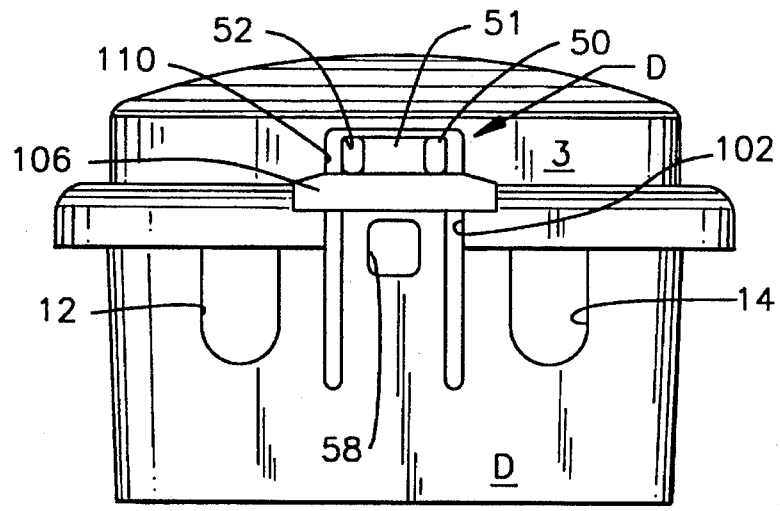
FIG. 3 is an end elevational view thereof.
Figure 4:
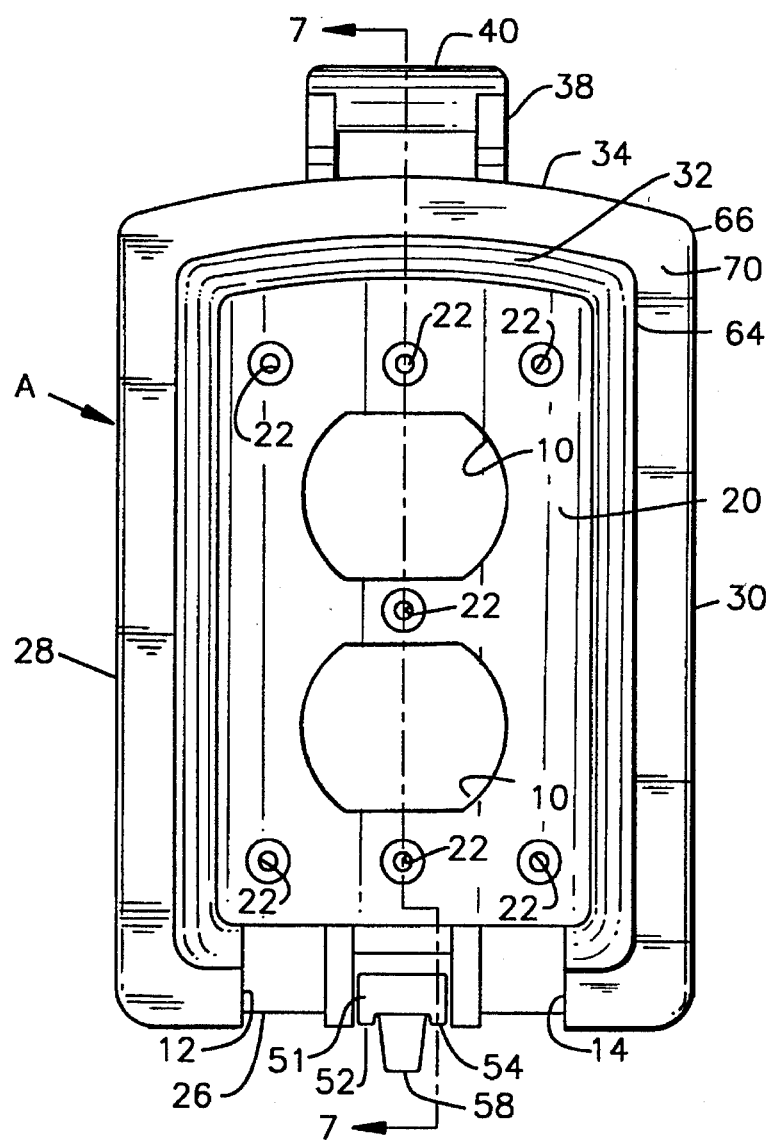
FIG. 4 is a plan view looking into the interior of the box portion of the housing with the cover removed therefrom.
Figure 5:
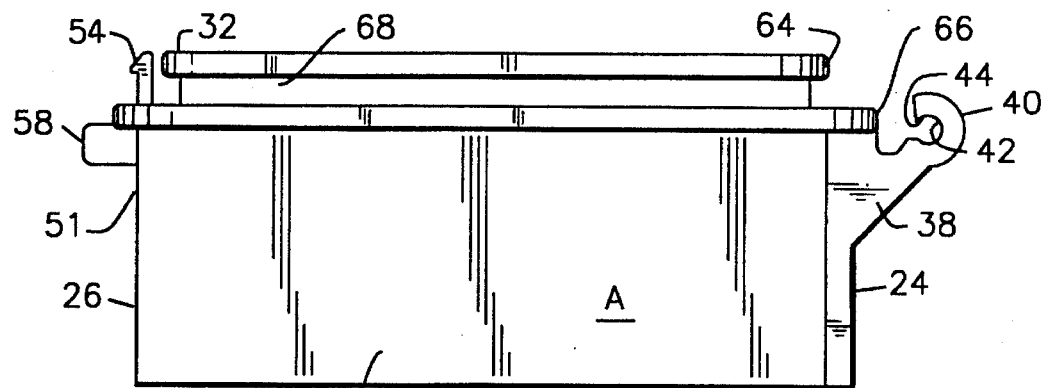
FIG. 5 is a side elevational view of the box of FIG. 4.

Referring now to the drawing, wherein the showings are for purposes of illustrating certain preferred features of the invention only and not for purposes of limiting same, FIGS. 1–3 show a box A having a cover B in a closed position thereon. Cooperating integral hinge means C between box A and cover B allows swinging movement of the cover between open and closed positions. Cooperating integral latch means D between the box and cover releasably latches the cover to the box in the cover closed position.

A backwall on box A has openings therein as shown at 10 in FIG. 1 for alignment with outlets on an electrical receptacle. The prongs on an electrical plug are extendable through openings 10 for reception in the electrical outlets on an electrical receptacle. With an electrical plug so received within the box, the electrical cord on the plug is received in a slot 12, 14 in a lower portion of the box peripheral wall as shown in FIG. 3. While the present invention is shown for use with outlets of an electrical receptacle, the present invention may be employed with other electrical devices.

The protective housing of the present application is preferably molded of plastic material, and the integral hinge means and latch means are also molded integrally with the box and cover. Although the embodiment shown and described in this application is for use with a junction box supporting a single receptacle having a pair of outlets, it will be recognized that the housing of the present application can be made in other sizes for protecting a pair of receptacles having four outlets. Obviously, other sizes and arrangements are also possible.

Referring to FIGS. 4–7, box A has a substantially flat backwall 20 with openings 10 therein of substantially the same size and shape as the outlets on an electrical receptacle. A plurality of punchouts are provided in backwall 20, which may be selectively removed to accommodate screws to attach box A to a junction box cover plate, to a junction box or to the receptacle. All of such punchouts are generally indicated by the same numeral 22. The installer need only remove the punchouts 22 through which the screws are to be inserted and leave the remaining punchouts intact.

A box peripheral wall extends upwardly from backwall 20. Box backwall 20 is mountable in a substantially vertical position so that the box peripheral wall includes an upper portion 24, a lower portion 26 and a pair of opposite side walls 28, 30. The box has a front opening surrounded by a terminal end 32 of the box peripheral wall.

A pair of spaced-apart triangular gussets 36, 38 extend outwardly from upper wall portion 24. A hinge socket member 40 spans gussets 36, 38 and has a substantially cylindrical socket 42 therein. A restricted or narrowed entrance opening 44 in socket member 40 provides access to socket 42. Entrance opening 44 faces generally toward upper wall portion 24.

Figure 6:
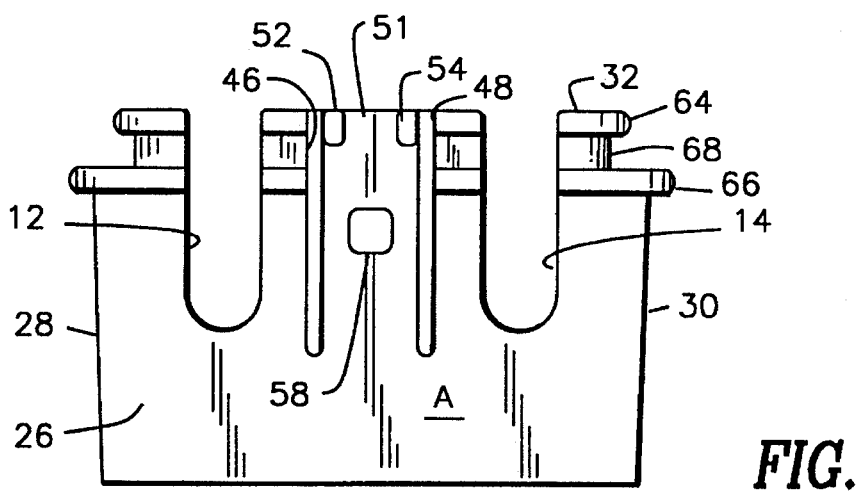
FIG. 6 is an end elevational view of the box of FIGS. 4 and 5.
Figure 7:
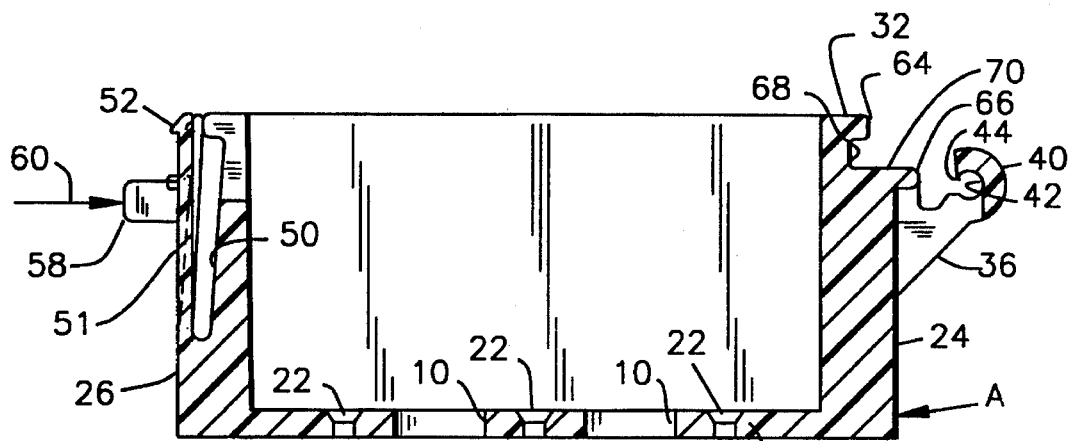
FIG. 7 is a cross-sectional elevational view taken generally on line 7—7 of FIG. 4.
Figure 8:
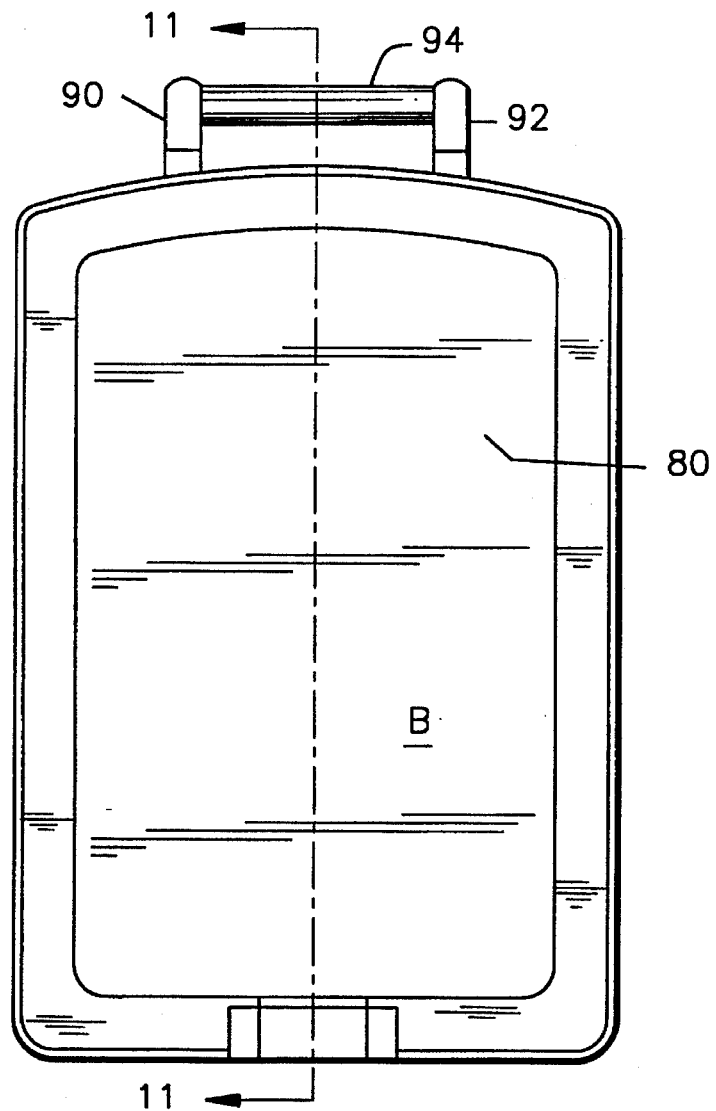
FIG. 8 is a plan view of the cover used with the box of FIGS. 4–7.
Figure 9:
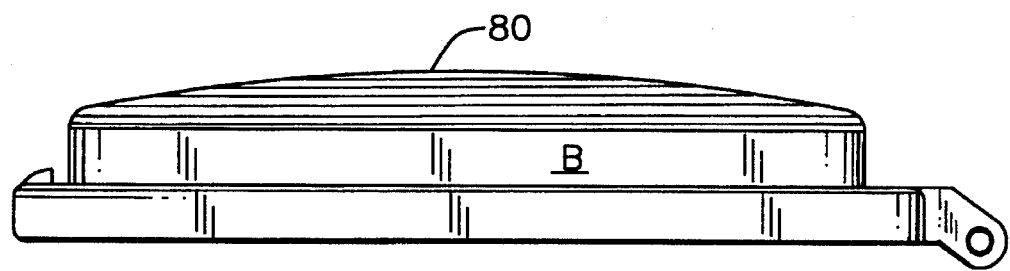
FIG. 9 is a side elevational view of the cover of FIG. 8.

As shown in FIGS. 6 and 7, a pair of spaced-apart elongated slits 46, 48 in lower wall portion 26 intersect an elongated internal cavity 50 in lower wall portion 26 to define an elongated resilient latch finger 51 having latch projections 52, 54 thereon. An elongated enlarged boss 58 on finger 51 is engageable by a person's thumb or finger to move latch finger 51 and its projections 52, 54 to the right in the direction of arrow 60 in FIG. 7 toward the interior of the box.

A first peripheral bead 64 extends outwardly from the box peripheral wall adjacent the front opening of the box adjacent the terminal end 32 of the box peripheral wall. A second peripheral bead 66 extends outwardly from the box peripheral wall in a location spaced toward box backwall 20 from first bead 64. The box peripheral wall is inwardly offset as generally indicated at 68 between first and second beads 64, 66. The groove 68 communicates with cord receiving slots 12 and 14 formed in the lower portion 26 of the peripheral wall. This provides a shoulder 70 adjacent second bead 66 that faces in a direction away from box backwall 20.

The arrangement shown and described with beads 64, 66 and inwardly offset box peripheral wall portion 68 effectively provide an external peripheral groove in the box peripheral wall. One side of the groove has shoulder 70 aligned therewith, and the other side of the groove is defined by first bead 64. The bottom of the groove is defined by inwardly offset peripheral wall portion 68.

The pair of elongated cord receiving slots 12, 14 are provided in lower wall portion 26 on opposite sides of latch finger 51. The box peripheral wall has a predetermined height extending upwardly from box bottom wall 20. The slots 12, 14 have a length that is greater than one-half the height of lower wall portion 26 but substantially less than the entire height of lower wall portion 26. Slots 12, 14 extend into lower wall portion 26 from peripheral wall terminal end 32 and have smoothly curved terminal slot ends.

Referring to FIGS. 8–11, cover B includes an outwardly curved or slightly domed top portion 80 having a cover peripheral wall depending therefrom. The cover peripheral wall includes a first cover peripheral wall portion 82 whose internal size and shape are substantially the same as the external size and shape of first bead 64 on box A. A second cover peripheral wall portion 84 is outwardly offset from first cover peripheral wall portion 82. The internal size and shape of second cover peripheral wall portion 84 is substantially the same as the external size and shape of second bead 66 on box A. Obviously, the internal size of first and second cover peripheral wall portions 82, 84 can be slightly larger than the external size of beads 64, 66 in order to allow the cover the overlap the beads. A substantially flat or horizontal shoulder 85 is provided between first and second peripheral wall portions 82, 84 for cooperation with shoulder 70 on box A.

A pair of spaced-apart supports 90, 92 extend outwardly from an upper wall portion of cover B. An elongated hinge pintle 94 extends between supports 90, 92 in outwardly-spaced relationship to second cover peripheral wall portion 84. Pintle 94 is substantially cylindrical but has a flat 96 formed thereon facing generally toward the cover to facilitate insertion of pintle 94 into socket 42 on the box hinge. The maximum dimension of pintle 94 measured in a direction perpendicular to flat 96 is approximately equal to the entrance opening 44 to hinge socket 42 to provide for snap-fit assembly. Thus, cover B is positionable in a raised position with the small dimension of hinge pintle 94 aligned with entrance opening 44 to allow insertion of pintle 94 into socket 42. The cover is then rotated downwardly so that the flat is no longer aligned with the entrance opening and the hinge pintle is retained with the hinge socket.

Figure 10:
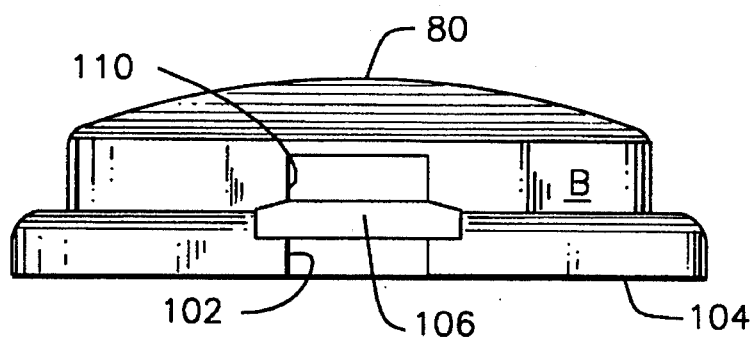
FIG. 10 is an end elevational view of the cover of FIGS. 8 and 9.
Figure 11:
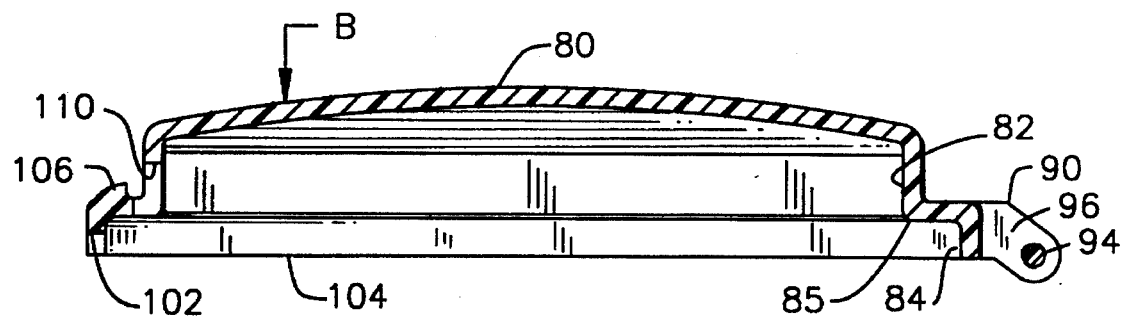
FIG. 11 is a cross-sectional elevational view taken generally on line 11—11 of FIG. 8.

As shown in FIGS. 10 and 11, the lower peripheral wall portion of cover B opposite from hinge pintle 94 has a notch 102 extending inwardly from cover peripheral wall terminal end 104. An outwardly and upwardly raised thickened cover peripheral wall portion 106 is provided above notch 102, and separates such notch from a generally rectangular hole 110 in the cover peripheral wall. Wall portion 106 effectively defines a catch that cooperates with the latch projections 52, 54 on the box in a camming fashion to secure the lid to the box.

FIG. 3 shows finger latch projections 52, 54 extending through cover hole 110 and latched behind catch 106. Notch 102 in cover B receives a portion of boss 58 on the latch finger to allow easy access thereto.

Figure 12:
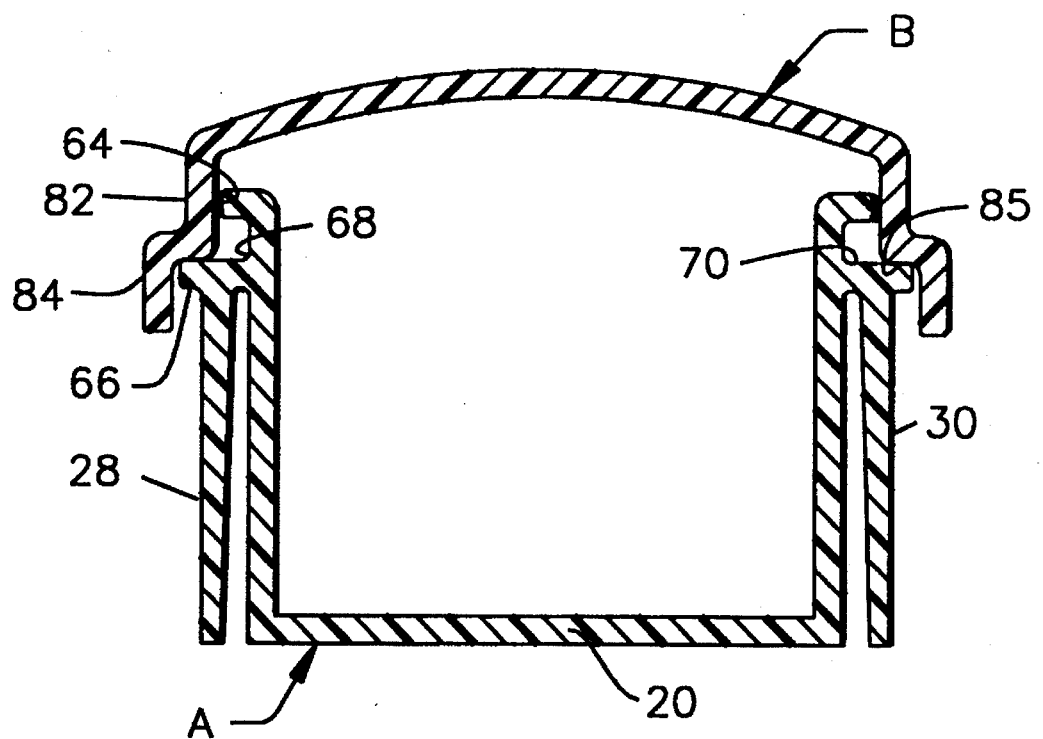
FIG. 12 is a cross-sectional elevational view taken generally on line 12—12 of FIG. 2.

FIG. 12 shows first and second cover peripheral wall portions 82, 84 closely overlapping first and second beads 64, 66 on box A, and with shoulders 70, 85 in abutting relationship. The overlapping area between the cover and box shown in FIG. 12 is shaped to provide a very tortuous path that inhibits moisture and dirt from entering box A. When the housing is installed with the box backwall vertical, any moisture that does enter the overlapping area will drain toward the bottom or lower wall portion of the box through the groove represented by numeral 68.

Although the invention has been shown and described with respect to a preferred embodiment, it is obvious that equivalent alterations and modifications will occur to others skilled in the art upon the reading and understanding of this specification. The present invention includes all such equivalent alterations and modifications, and limited only by the scope of the claims.

We claim:

1. In a protective housing for electrical devices, a box having a backwall, a peripheral wall and a front opening, a first peripheral bead extending outwardly from said peripheral wall adjacent said front opening, a second peripheral bead extending outwardly from said peripheral wall at a location spaced toward said backwall from said first peripheral bead, and said peripheral wall being inwardly offset between said first and second peripheral beads, said housing including a cover movable between an open position for providing access to the interior of said box through said front opening therein and a closed position for closing said box front opening, said cover comprising a cover peripheral wall including a first cover peripheral wall portion closely overlying said first peripheral bead on said box and an outwardly offset second cover peripheral wall portion closely overlying said second peripheral bead on said box.

2. The housing of claim 1 wherein said peripheral wall is inwardly offset adjacent said second peripheral bead to provide a shoulder adjacent said second peripheral bead that faces in a direction away from said backwall.

3. The housing of claim 1 wherein said box peripheral wall has opposite upper and lower wall portions, hinging means on said upper wall portion for hingedly connecting said cover thereto, and a latch on said lower wall portion for latching said cover thereto.

4. The housing of claim 3 wherein said hinging means comprises a hinge socket for receiving a hinge pintle on said cover.

5. The housing of claim 3 wherein said latch comprises an elongated flexible latch finger having a latch projection thereon.

6. The housing of claim 3 including at least one slot in said lower wall adjacent said latch for receiving an electrical cord.

7. The housing of claim 3 including a pair of cord receiving slots in said lower wall on opposite sides of said latch.

8. The housing of claim 7 wherein said lower wall has a predetermined height extending outwardly from said bottom wall and said slots have a length that is at least one-half of said predetermined height but substantially less than said predetermined height.

9. The housing of claim 1 including integral cooperating hinge means on said cover and box for hingedly connecting said cover to said box for swinging movement between said open and closed positions.

10. The housing of claim 9 including integral cooperating latch means on said box and cover for releasably latching said cover in said closed position thereof.

11. The housing of claim 10 wherein said latch means comprises an elongated flexible latch finger on said box and having a latch projection thereon, and a latch projection catch on said cover.

12. The housing of claim 1 wherein said box peripheral wall includes upper and lower wall portions, integral cooperating hinge means on said cover and said upper wall portion for hingedly connecting said cover to said box, integral cooperating latch means on said cover and said lower wall portion for releasably latching said cover in said closed position thereof, and a pair of cord receiving slots in said lower wall portion of said box on opposite sides of said latch means.

13. The housing of claim 1 wherein said cover has a peripheral wall and the height of said box peripheral wall is substantially greater than the height of said cover peripheral wall.

14. A housing for electrical devices comprising:

a box and cover, said box having a backwall, a peripheral wall and a front opening, said peripheral wall having a terminal end surrounding said opening, said cover having a cover peripheral wall;

said box peripheral wall having a height substantially greater than a height of said cover peripheral wall;

said cover peripheral wall outwardly overlapping a portion of the height of said box peripheral wall in a cooperative overlapping area between said cover peripheral wall and said box peripheral wall;

said box peripheral wall in said overlapping area having a pair of spaced-apart outwardly extending peripheral beads thereon and said cover peripheral wall being closely received over said beads, said cover peripheral wall and said box peripheral wall in said overlapping area being cooperatively shaped to provide a gasketless tortuous path inclusive of a peripheral groove that inhibits entry of dirt and moisture into the interior of said box, and said box peripheral wall including a cord receiving slot therein extending from said terminal end of said box peripheral wall toward said backwall, said slot having a length that is substantially less than the height of said box peripheral wall but greater than one-half the height of said box peripheral wall.

15. The housing of claim 14 wherein a first of said beads is adjacent said box front opening, said box peripheral wall in said overlapping area being shaped such that the other of said beads is spaced outwardly and toward said backwall from said first bead.

16. A housing for electrical devices comprising a box and cover, said box having a backwall, a peripheral wall and a front opening, said peripheral wall having a terminal end surrounding said opening, said cover having a cover peripheral wall, said box peripheral wall having a height substantially greater than a height of said cover peripheral wall, said cover peripheral wall outwardly overlapping a portion of the height of said box peripheral wall in a cooperative overlapping area between said cover peripheral wall and said box peripheral wall, said cover peripheral wall and said box peripheral wall in said overlapping area being cooperatively shaped to provide a gasketless tortuous path that inhibits entry of dirt and moisture into the interior of said box, and said box peripheral wall including a cord receiving slot therein extending from said terminal end of said box peripheral wall toward said backwall, said box peripheral wall in said overlapping area comprising pair of spaced-apart outwardly extending peripheral beads thereon and said cover peripheral wall being closely received over said beads, a first of said beads being adjacent said box front opening, said box peripheral wall in said overlapping area being shaped such that the other of said beads is spaced outwardly and toward said backwall from said first bead.

17. The housing of claim 16 wherein said slot has a length that is substantially less than the height of said box peripheral wall but greater than one-half the height of said box peripheral wall.

18. A housing for electrical devices comprising:

a box and cover, said box having a backwall, a peripheral wall and a front opening, said peripheral wall having a terminal end surrounding said opening, said cover having a cover peripheral wall;

said box peripheral wall having a height substantially greater than a height of said cover peripheral wall;

said cover peripheral wall outwardly overlapping a portion of the height of said box peripheral wall in a cooperative overlapping area between said cover peripheral wall and said box peripheral wall:

said cover peripheral wall and said box peripheral wall having cooperative abutment shoulders;

said box peripheral wall having at least two outwardly extending beads disposed within said overlapping area, and said cover peripheral wall being cooperatively shaped with said box peripheral wall in said overlapping area, thereby providing a gasketless tortuous path including a peripheral groove that inhibits entry of dirt and moisture into the interior of said box, and said box peripheral wall including a cord receiving slot therein extending from said terminal end of said box peripheral wall toward said backwall, said slot having a length that is substantially less than the height of said box peripheral wall but greater than one-half the height of said box peripheral wall.

* * * * *